June 28, 1949.
D. C. COX
2,474,230
TWO-DIMENSIONAL PHOTOELECTRIC SORTING
Filed Jan. 23, 1948
3 Sheets-Sheet 1
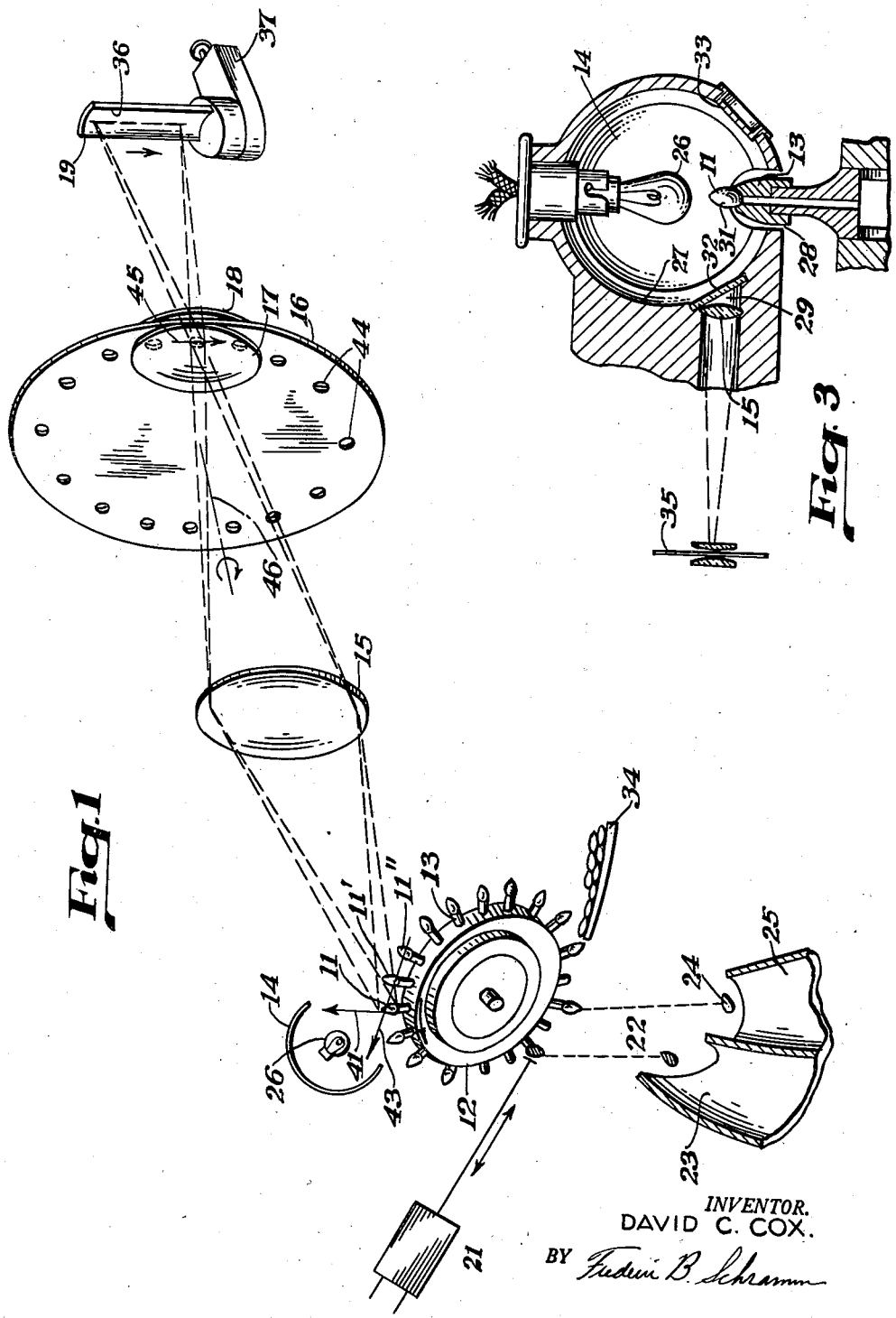
INVENTOR.
DAVID C. COX.
BY Frederic B. Schramm
ATTORNEY.

June 28, 1949.  D. C. COX  2,474,230
TWO-DIMENSIONAL PHOTOELECTRIC SORTING
Filed Jan. 23, 1948  3 Sheets-Sheet 2
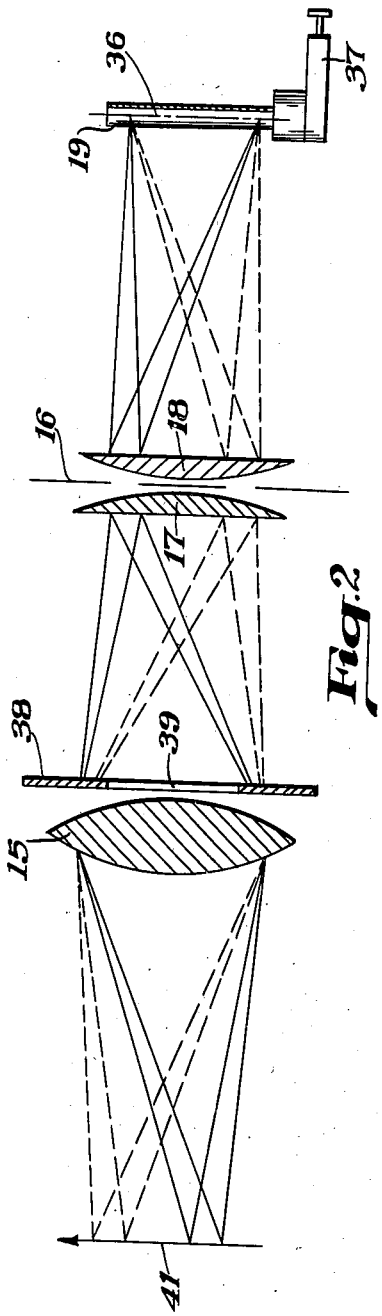
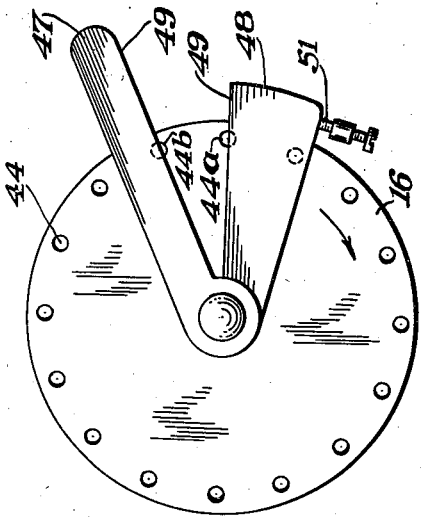
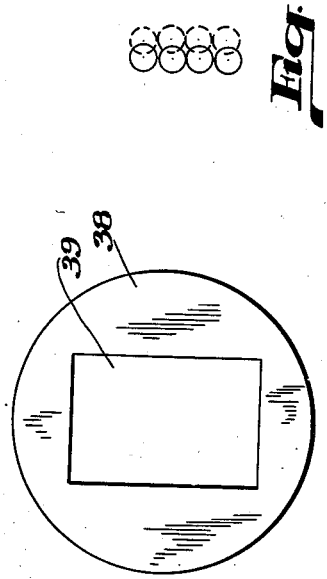
INVENTOR.
DAVID C. COX.
BY Frederic B. Schramm
ATTORNEY.

June 28, 1949.　　　　　D. C. COX　　　　　2,474,230
TWO-DIMENSIONAL PHOTOELECTRIC SORTING
Filed Jan. 23, 1948　　　　　　　　　　　　　　　3 Sheets-Sheet 3

INVENTOR.
DAVID C. COX.
BY Frederic B. Schramm
ATTORNEY.

Patented June 28, 1949

2,474,230

UNITED STATES PATENT OFFICE 2,474,230

TWO-DIMENSIONAL PHOTOELECTRIC SORTING

David C. Cox, Grand Rapids, Mich., assignor to Electric Sorting Machine Company, Grand Rapids, Mich., a corporation of Michigan Application January 23, 1948, Serial No. 3,876

11 Claims. (Cl. 250—41.5)

My invention related to optical sorting and has for its principal object increasing the range of usefulness of photoelectric sorting techniques.

In sorting machines of the light and dark type, such as described in my Patent #2,325,665, for example, articles are sorted by comparing the average brightness or reflectivity of the surface of an article with a background. The articles to be sorted are carried along a fixed path by a suitable conveyer. If the articles are irregular in shape, the response of the apparatus may be affected by the position in which the article is held with respect to the optical viewing arrangements. Large variations in size among the articles may also affect the precision obtainable.

It is an object of my invention to enable articles to be sorted optically by an examination of the reflectivity of the surface without the necessity for the object being held in a predetermined position if it is of the irregular shape and without the necessity for the object following a fixed path with great exactness.

A further object of the invention is to enable objects to be sorted accurately without the necessity for absolute maintenance of the background in order to reject the articles which differ from those considered passable.

Still another object of the invention is to enable articles to be sorted for defects, such as small spots where the skin has been torn from the article or where, for other reasons, there is a spot on the article which differs from the desired appearance. More particularly, it is an object of the invention to enable articles to be sorted out which have defects in the form of spots regardless of whether the object, as a whole, is relatively light or relatively dark.

Still another object of the invention is to enable articles to be sorted by examining successive areas over the surface of the article and not merely viewing the article as a whole.

Still another object of the invention is to enable articles to be sorted without exact requirements as to the size of articles which may be sorted.

A further object is to permit employment of photoelectric tubes for optical sorting notwithstanding lack of uniformity in the sensitivity of the active surface of such tubes.

Still another object is to prevent variations in sensitivity or dead spots in the sensitive surface of the photoelectric tube from affecting the accuracy of sorting.

Other and further objects, features and advantages of the invention will become apparent as the description proceeds.

In carrying out the invention in accordance with a preferred form thereof, means, such as a photoelectric tube, are provided which are responsive to variations in reflectivity of the articles to be sorted. The articles are brought into the view of the photoelectric tube successively and an optical scanning arrangement is provided for exposing the photoelectric tube, as a whole, to successive portions of the surface of the article. The reflected light beams from each portion of the article are spread out in such a manner that they substantially cover the sensitive surface of the photoelectric tube and the response of the tube is, therefore, unaffected by the presence or absence of variations in sensitivity in different portions of its surface and the response does not depend upon whether a defective portion of the surface of an article is in one position or another relative to the sensitive surface of the photoelectric tube.

A better understanding of the invention will be afforded by the following detailed description considered in conjunction with the accompanying drawing in which Fig. 1 is a schematic perspective diagram illustrating the method of optically sorting articles in accordance with my invention;

Fig. 2 is an optical diagram of an optical system which may be employed in carrying out the invention;

Fig. 2A is a diagram of an objective lens stop.

Fig. 3 is a detailed view of a viewing chamber which may be employed in carrying out my invention;

Fig. 4 is a diagram illustrating in part the principle of operation of the invention;

Fig. 5 is a detailed view of a form of scanning device which may be employed;

Like reference characters are utilized throughout the drawing to designate like parts.

Figure 7:
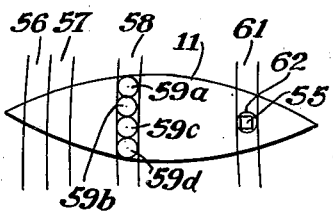
Fig. 7 is a diagram illustrating the principle of operation involved in scanning the surface of an article.

In order to detect off-color spots or damage to an article 11, such as spots where the skin has been torn away in the case of an almond, the surface of the almond 11 is scanned. An image of the article is formed in a focal plane at which lateral scanning is caused to take place which, in conjunction with the movement of the article, results in scanning of the entire surface of the exposed side of the article. In order to prevent making the detection of an off-color spot dependent upon the angle from which the scanned image is viewed, if the viewing is done by the human eye, or to make the operation independent of variations in sensitivity of the surface of the photoelectric tube if such a device is employed, the image of the article is defocused at the location of the eye or the photoelectric tube, preferably by bringing the image of an objective lens into focus at the viewing position.

Although my invention is not limited to the use of the specific apparatus herein illustrated, a preferred form of apparatus has been illustrated in the drawings to facilitate explanation of the invention.

Suitable apparatus, such as represented in Fig. 1, comprises a conveyor means including a rotating wheel 12 carrying suction cups 13 for holding the articles 11, 11', 11'', etc., a viewing chamber 14 schematically represented in Fig. 1, an objective lens or lens system 15, a rotatable scanning disc 16, a second lens or lens system preferably comprising a pair of lens 17 and 18, and a photoelectric tube 19. A suitable control mechanism (not shown) is provided for operating a schematically indicated ejecter 21 for knocking a defective article 22 into a cull chute 23 in case the photoelectric tube 19 receives an impulse of greater or less than normal brilliance, or for allowing a passable article 24 to fall into a pass chute 25 after it has reached the position on the conveyor wheel 12, at which the suction is cut off in case no portion of the surface is of such color or reflectivity as to cause an abnormal deviation in the illumination of the photoelectric tube 19. Such ejector control mechanism responsive to the photoelectric tube 19 for operating the ejector 21 need not be further described herein as examples are described in my copending application Serial No. 738,714 filed April 1, 1947 and in various patents granted to me, such as #2,325,665 patented August 3, 1943, for Sorting machine; #2,131,095 patented September 27, 1938 for Means for sorting homogeneous articles; #2,152,758 patented April 4, 1939 for Sorting machine; and #2,244,826 patented June 10, 1941 for Sorting machine.

Where a rotating wheel type of conveyor is employed, the viewing chamber 14 may take the form generally illustrated in Fig. 4 of my Patent #2,325,665. As shown in greater detail in Fig. 3 of the present application, such a viewing chamber includes an electric lamp 26 so located in the chamber as to illuminate both sides of the article 11 in the viewing chamber by light diffused from the walls 27 of the viewing chamber 14. An opening 28 is provided in a portion of the viewing chamber, for example the bottom, to enable the edge of the conveyor wheel 12 to enter the viewing chamber 14 and carry the articles in succession through the viewing chamber upon the suction cups 13. An aperture 29 is provided for emission of light reflected from the side 31 of the article 11. As explained in some of my aforesaid patents a dual system may be employed for examining both sides of the article 11. Preferably a dust plate 32 of transparent material is provided to close the aperture 29. Opposite the article 11 in the line of sight through the aperture 29, a background plate 33 is preferably mounted in this type of viewing chamber for cases where the sorting of the article is to be accomplished by comparison of its color or reflectivity with that of the background plate 33. It will be understood that in such cases the background plate 33 is removable and backgrounds of the desired hue and shade are provided for the type of articles being sorted.

As described in greater detail in my aforesaid copending application and some of my said patents, when this type of conveyor wheel 12 is employed the articles are fed thereto by a revolving bowl 34 and suction applying and cut-off means are provided for supplying the suction to the suction cups successively as each suction cup reaches the edge of the conveyor bowl 34 to pick up one of of articles and the suction remains until the suction cup has reached the position above the pass chute 25. For simplicity the ejector 21 has been illustrated in an angular position different from that actually employed.

For the sake of explanation I have shown articles being carried upon a conveyor wheel 12. Nevertheless, in accordance with my present invention it is not necessary that the articles follow a predetermined path with great exactness as they are being viewed. Furthermore, it is not necessary that the articles adopt any predetermined position upon the suction cups 13. In fact, my invention is not limited to a type of conveyor having suction cups, or other holding means, and may be employed in connection with viewing of falling articles or articles sliding along a chute or traveling in some other manner in a roughly defined course where they may be properly illuminated. In case a viewing chamber 14 of the type illustrated in Fig. 3 is employed, the objective lens or lens system 15 is mounted in the aperture 29. As will be understood by those skilled in the art, the objective lens means preferably take the form of a pair of achromatic lenses; but, for simplicity in the drawing a single lens means has been illustrated.

The lens means 15 is so designed as to project an image of the surface of the side 31 of the article into a focal plane 35. In accordance with my present invention, however, the photoelectric tube 19 is preferably not mounted at the focal plane 35; but instead defocusing means are provided taking the form of the lens system 17 and 18. Preferably a pair of slightly separated lenses is employed instead of a single lens in order that the scanning disc 16 may be mounted directly in the focal plane 35 and the optical center of the lens system 17 and 18 will also lie within this focal plane. The photoelectric tube 19 is mounted beyond the focal plane 35 at such a position that its sensitive surface 36 and the objective lens 15 are at conjugate foci of the lens system 17 and 18. Since photoelectric tubes as ordinarily constructed do not have cathode surfaces or sensitive surfaces which lie exactly in a plane or exactly along the surface of focal points produced by a lens, some adjustment in the mounting position of the photoelectric tube 19 is preferably provided in order that it may be positioned in the location given the best average effect. For example, an adjustable mounting bracket 37 may be provided.

The arrangement is such that the lens system 17 and 18 focuses an image of the objective lens 15 upon the sensitive surface 36 of the photoelectric tube 19. Since the sensitive surface does not conform in shape to the article 11 or the objective lens 15, a stop 38 is preferably provided at the objective lens 15. As shown in Fig. 2A, the stop 38 is provided with an opening 39 of such a shape as to conform as nearly as possible to the shape of the sensitive surface of the type of photoelectric tubes employed.

The optical principles involved are illustrated diagrammatically in Fig. 2. It will be seen from this diagram that light reflected from any portion of an object 41, represented by an arrow, diverges and spreads across the objective lens 15. Consequently, every portion of the image 39 in the stop 38 receives light from every portion of the object 41. Accordingly, the objective lens image 39, which is cast into focus at the photo-electric tube sensitive surface 36 by the lens system 17 and 18, is completely out of focus with respect to the actual object 41. The light reflected from any portion of the object 41 is spread substantially uniformly over the sensitive surface 36 of the photoelectric tube 19. For this reason variations in sensitivity at different portions of the surface 36 of the photoelectric tube 19 do not result in false indications or different response by the photoelectric tube to the scanning of one portion of the surface of the article 11 from the response to the scanning of another portion of the surface of the article 11.

Figure 12:
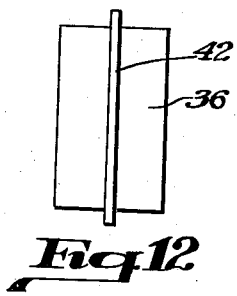
Fig. 12 is a schematic diagram of a photoelectric tube illustrating reasons for variations in sensitivity in different portions of the surface thereof.

As shown in Fig. 12, photoelectric tubes necessarily include an anode 42 as well as a cathode 36. Directly behind the anode 42 the cathode is in the shadow of the anode 42, and consequently this portion of the area of a projected image is dead. Furthermore, it has been found impracticable to obtain photoelectric tubes which are uniformly sensitive throughout even the remaining surface of the cathode 36. Accordingly, in accordance with my invention, I provide the arrangement described in which an integration is obtained over the entire surface of the photoelectric tube 19, regardless of which portion of the article 11 is being scanned.

During the time that the articles 11 are in the field of view they are traveling along a short arc which is substantially along a straight line 43. The scanning disc 16 is provided with apertures 44 and the scanning disc 16 is so mounted that each aperture 44 is traveling along an arc forming substantially a portion of a straight line 45 perpendicular to the direction of motion 43 of the article 11 being viewed. Since the articles travel in the direction 43 and the aperture 44 selects a small portion of the surface of the articles traveling along the line 45, complete scanning of the surface of the articles is obtained. The movement of the articles provides the longitudinal component of scanning and the movement of the scanning aperture 44 provides the lateral component.

The speed ratio between the conveyer wheel 12 and the scanning disc 16 is preferably so chosen that a new aperture comes into the field of view, at least within the time required for the portion of the surface of the article selected by the aperture to travel the longitudinal distance represented by the diameter of the aperture. If, as in the arrangement illustrated, the diameters of the apertures are one-fourth the diameter of the field of view of the object lens 15, the linear speed of the apertures is preferably four times the linear speed of the article holding cups 13. For example, as illustrated in Fig. 4, the lateral scanning speed may be 50% greater than the minimum, viz., six times the longitudinal speed of the article so that a 50% overlap of the successive aperture images is obtained. As indicated in Fig. 1, the scanning disc 16 is mounted upon a shaft 46 driven by any suitable means. The shaft 46 may, for example, be geared to the same drive as the conveyer wheel 12; but, for the sake of obtaining adequate speed with the lightest and most compact equipment, I prefer to provide a separate drive such as a source of compressed air and an air vane secured to the shaft 46, there being no necessity for perfect synchronism or integral speed ratio between the shaft 46 and the conveyer wheel 12. As will be explained more in detail hereinafter, the invention is not limited to the use of a scanning wheel as other scanning devices such as vibrating shutters or mirrors may also be employed.

Where a scanning wheel is employed, as shown in Fig. 1, having a plurality of apertures 44 coming successively into view, it is important to avoid large variations in the illumination of the photoelectric tube 19 when there is no change in light supplied by the objective lens 15; for example, when there are no articles 11 and merely the background 33 is being viewed. If two successive apertures 44 were allowed to come into the field of view of the photoelectric tube 19 simultaneously at the time of transition from viewing by one aperture to the next, there would be a sudden doubling in the illumination of the photoelectric tube 19. To avoid the necessity for providing a blanking out mechanism in the photoelectric tube control circuits, I preferably provide adjustable stops or arms 47 and 48, as shown in Fig. 5. Assuming that the apparatus is so constructed that only one aperture image at a time is to be viewed in the photoelectric tube 19, the stops 47 and 48 are set at an angle between cut-off edges 49 equal to the angle between the apertures 44 in the disc 16.

The arms 47 and 48 may be made wide enough to cut off apertures on either side of the optical system, including the objective lens 15, and the defocusing lens 16 and 17 may be made such that not more than two apertures at a time will, in any event, come within the field of view. One of the arms, for example the arm 47, is provided with a friction mounting whereby it may be manually adjusted to cut off at one side, for example, the upper side of the desired field of view, and the other arm 48 is provided with a fine adjustment, as by means of a micrometer screw 51 for example, to enable it to be set very closely to adjust the other side, for example, the lower side of the field of view.

The desired adjustment is that in which the exposed portion of one aperture, for example an aperture 44A, diminishes just as rapidly as the exposed portion of the aperture 44B increases during the time that adjacent apertures are at the edges of the field of view. For example, in the position illustrated in Fig. 5, one half of the aperture 44A is exposed while the corresponding half of the aperture 44B is eclipsed. In practice this adjustment is obtained by examing the electrical responses of the photoelectric tube in an oscilloscope while the scanning disc 16 is rotated with a uniform light output from the object lens 15. If there is any inaccuracy in the adjustment of the setting screw 51, it will be observable in the deflection of the oscilloscope beam and the correction is made by adjusting the screw 51 until there is no observable deviation at the instants corresponding to the angular positions when the apertures 44 cross the lines 49. Gradual deviations resulting from inaccuracy in the positioning of the photoelectric tube 19 can also be detected in such examination of the photoelectric tube. These are corrected by suitable adjustment of the mounting bracket 37, shown in Fig. 2, so as to bring the sensitive surface 36 of the photoelectric tube 19 as nearly as possible in conformity with the effective focal plane of the image 39 of the object lens 15.

Figure 11:
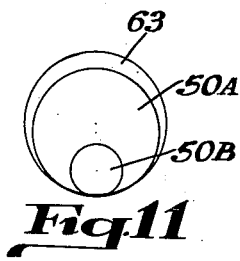
Fig. 11 is a diagram illustrating variations in sizes of articles to be sorted.

As explained in my aforesaid patents, articles may be sorted optically by either ejecting or selecting those articles which deviate from the preselected color range or which are either lighter or darker than a predetermined brightness for which the apparatus is set. Likewise, the articles may be sorted by comparsion with a preselected background and ejected in case the article is darker or lighter than the background. The so-called light and dark system or non-color system may be either "light" trip or "dark" trip. If the defective article has a spot or area which is much darker or lighter than the rest of the article, it is ejected by reason of the fact that the average reflectivity is brought above or below the pre-set value and close adjustment enables such articles to be rejected; but adjustment for spots deviating slightly from normal cannot be obtained. In the case of sorting articles of various sizes as shown in Fig. 11, it is necessary to have the field of view large enough to include the major axis of the largest article 50A in order that articles will not pass which have defective areas outside the field of view. Small articles 50B which are excessively light or excessively dark by a large amount will be rejected, even though they do not fill the field of view 63, because they raise or lower the average brightness of the field. In this case also it is difficult to find an adjustment which will sort small articles deviating slightly in darkness from the standard.

Figure 6:
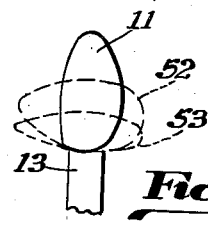
Fig. 6 is a diagram illustrating the various positions which an irregular object may take upon a supporting cup on a suction tube.
Figure 8:
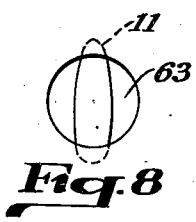
Figs. 8, 9 and 10 are diagrams illustrating effects of variations in position of irregular articles in the field of view of optical sorting devices.
Figure 9:
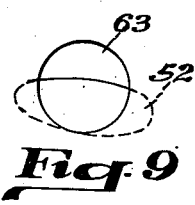
Figure 10:
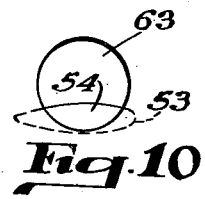

In accordance with my present invention I am able to obtain still finer and more exact selection of articles to be passed and rejected by reason that I do not cause the photoelectric tube to view the articles and the background as a whole, but scan successive portions of the article. In the case of an article of an irregular shape, as an almond or lima bean, it is immaterial what position it takes upon the suction cups 13 or in what position it falls or slides into the field of view. For example, as illustrated in Fig. 6, such an irregular article 11 may be presented on end, as shown in full lines, on a thin side as represented in dotted lines by the article 52, or on the broad side thereof indicated in dotted lines by the article 53. If the field of view is a circle having approximately the diameter of the greatest dimensions of the article to be sorted, the articles 11, 52 and 53 may appear with respect to the field of view, as in Figs. 8, 9 and 10 respectively.

In however manner the article is presented in the field of view, an article having a defective or discolored area is detected by the method described. For example, if almonds are to be detected in which small areas of the skin have been torn away, the detection is made by the light trip method for the reason that the nutmeat under the skin is white in comparison with the brown normal skin. The detection is unaffected by variations in the darkness of the unbruised almonds and it is unnecessary to sort almonds of different colors of darkness separately in order to detect those having spots of skin torn away; for example, as illustrated in Fig. 7, an almond 11 having a spot 55 from which the skin has been torn. As the almond 11 is carried into the field of view successive strips 56, 57, 58, etc. are scanned. In the case of the strip 58 for example, the rotation of the scanning disc 16 results in circular portions 59A, B, C and D being viewed at separate instants for separate angular positions of the disc 16. At each of said instants the light of each portion of the small area is projected to all portions of the surface of the object lens 15, illuminating all of the stopped area 39 and causing an image of the shape corresponding to the shape of a sensitive surface of the photoelectric tube 19 to be projected into the photoelectric tube. If the surface of the almond in each of the spots 59A, B, C and D has the same reflectivity, there will be substantially no change in the response of the photoelectric tube and no action will take place. However, when the strip 61 of the almond 11 is being scanned, as the scanner aperture reaches the position of a circle 62, the area producing illumination of the photoelectric tube 19 will be coincident with the damaged spot 55. This spot 55 consists of white in comparison with the brown skin of the remainder of the almond, and the photoelectric tube will be much more strongly illuminated than normally. Accordingly the ejector 21 will be operated in accordance with the light trip procedure described in my aforesaid patents. Even if the spot 55 covered a relatively small area in comparison with the area 62, represented by the aperture 44 of the disc 16, operation could still be obtained without exceeding the limits of sensitivity for which the apparatus may be adjusted. Manifestly close response may be obtained in the photoelectric tube 36 to examine the entire field of view 63, as in Fig. 10, although only a small area 64 represents a part of the image of the article being examined. Furthermore, considerably more deviation between the brightness of the articles being examined and brightness of the background 33 is permissible when the article is being scanned longitudinally and laterally, in accordance with my invention, than where it is necessary for the photoelectric tube to examine the entire field of view at one time. In accordance with the present invention, therefore, small areas of discoloration may readily be detected and articles of various sizes and shapes will be examined. It is possible, in effect, for the photoelectric tube to hunt for the article it is to judge instead of making it necessary for the article to travel very precisely in a predetermined path.

Figure 13:
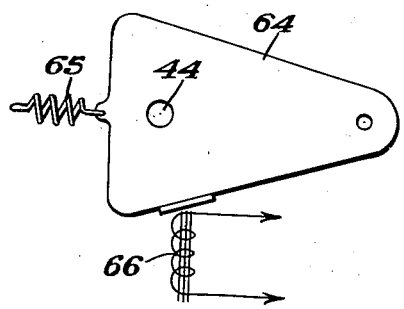
Fig. 13 is a schematic diagram of a modified form of scanning device of the aperture type.

Inasmuch as the defocusing lens 17, 18 should not move in order to avoid throwing the light beams on or off the photoelectric tube as the disc revolves, it is necessary that the defocusing lens system 17, 18 be stationary. The flicker effect is minimized at the photoelectric tube also by having the scanning disc 16 in the optical center of the defocusing lens 17, 18 at the focal plane to which the article image is projected by the object lens 15. For this reason the two defocusing lenses 17 and 18 are provided, to permit the disc 16 to travel in the optical center. The invention is not, however, limited to the precise arrangement illustrated in Figs. 1 and 2. For example, instead of a rotating aperture disc 16, a vibrating aperture plate 64 may be provided as illustrated in Fig. 13.

Figure 14:
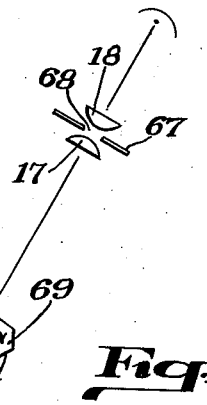
Fig. 14 is a schematic diagram of a modified form of scanning device of the mirror type.

The disc 16 or the plate 64 should be made very thin in order to avoid the necessity for polishing metal surfaces in the opening of the aperture 44. The plate 64, shown in Fig. 13, is provided with suitable mechanism for causing the aperture 44 to oscillate. For example, a centering spring 65 may be provided and a vibrator coil 66 supplied with alternating current of a frequency approximately equal to the natural frequency of vibration of the system, consisting of the spring 65 and the mass of the plate 64. It is to be understood that the stiffness of the spring and the mass of the parts are so chosen as to give a natural frequency of oscillation corresponding to the desired scanning speed. If a mirror type of scanner is employed instead of an aperture type, the vibrating or rotating mirror is preferably placed between the object 11 and the focal plane to which the image of the object is projected. For example, as illustrated in Fig. 14, a stationary plate 67 is mounted in the focal plane 35 having an eperture 68 therein and the defocusing lens system 17 and 18 is mounted at this focal plane, as in the arrangements previously described. A rotating prism 69 is provided having silvered plane surfaces 71 which successively reflect different portions of the surface of an object 11 in lateral strips toward the aperture 68. The object lens 15 may be on either side of the mirror 69 according to the optical design of the system, so long as it also is between the objective 41 and the focal plane plate 67. In place of a rotating mirror a silvered mirror may, of course, be employed, actuated by a suitable mechanism such as the vibrator coil as described at 66 in Fig. 13.

I have herein shown and particularly described certain embodiments of my invention and certain methods of operation embraced therein for the purpose of explaining its principle of operation and showing its application, but it will be obvious to those skilled in the art that many modifications and variations are possible and I aim, therefore, to cover all such modifications and variations as fall within the scope of my invention which is defined in the appended claims.

What I claim is:

1. In a photoelectric sorter a conveyer for carrying articles substantially along a linear path, lens means for focusing an image of the article substantially in a focal plane, a photoelectric tube, a second lens means at said focal plane for focusing an image of the first lens means on the photoelectric tube, and a scanning disc in said focal plane with apertures moving transverse to said conveyer path at a multiple of the speed of said conveyer for scanning successive areas on the surface of said article.

2. In a photoelectric sorter a conveyer for carrying articles substantially along a linear path, lens means for focusing images of the articles substantially in a focal plane, a photoelectric tube mounted in a position beyond said focal plane for receiving light projected from said lens means, and a scanning disc rotating in said focal plane carrying apertures transverse to said article path for scanning successive areas on the surface of articles carried by the conveyer.

3. In a photoelectric sorter a conveyer for carrying articles substantially along a linear path, lens means for focusing images of the articles substantially in a focal plane, a photoelectric tube mounted in a position beyond said focal plane for receiving light projected from said lens means, and a scanning device having an aperture therein interposed between said lens means and said photoelectric tube arranged for moving said aperture transverse to the line of motion of articles in the conveyer for scanning successive areas on the surface of the articles.

4. In a photoelectric sorter a conveyer for carrying articles substantially along a linear path, a photoelectric tube, lens means interposed between the conveyer and the photoelectric tube for projecting an image of the article in the direction toward the photoelectric tube, and a scanner also interposed between said conveyer and said photoelectric tube having an aperture therein with means for moving said aperture transverse to the direction of motion of the conveyer for laterally scanning portions of the surface of the article as the article is carried along longitudinally.

5. In a photoelectric sorter a conveyer for carrying articles to be sorted along a substantially linear path, a photoelectric tube, and an optical system for projecting light beams reflected from the article toward the photoelectric tube including transversely moving scanning means for diverting the light beams transversely to the direction of motion of the conveyer, whereby successive portions of the surface of the article are scanned laterally as the motion of the article on the conveyer provides longitudinal scanning.

6. In a photoelectric sorter in which articles to be sorted are supported in a predetermined location, a photoelectric tube, lens means interposed between said supporting location and said photoelectric tube for focusing an image of the articles in a focal plane between the lens means and the photoelectric tube, and a transversely moving scanning device for optically exposing the photoelectric tube to successive portions of the surface of an article at the supported location.

7. In a photoelectric sorter in which articles to be sorted are supported in a predetermined location, a photoelectric tube, lens means interposed between said supporting location and said photoelectric tube for focusing an image of the articles in a focal plane between the lens means and the photoelectric tube, a transversely moving scanning device for optically exposing the photoelectric tube to successive portions of the surface of an article at the supported location, and a lens means at said focal plane for projecting an image of the first lens means on the photoelectric tube.

8. In a photoelectric sorter in which articles to be sorted are supported in a predetermined location, a photoelectric tube, a transversely moving scanning device for exposing the photoelectric tube to successive portions of the surface of an article at the supported location, and an optical device for projecting an image of the article out of focus at the position of the photoelectric tube, whereby light reflected from any portion of the surface of the article is spread over a large area of the photoelectric tube to render the apparatus relatively unaffected by variations in sensitivity of the photoelectric tube over its area.

9. In a photoelectric sorter in which articles to be sorted travel along a path, a photoelectric tube, a scanning disc having apertures moving transverse to said path for exposing the photoelectric tube to successive portions of the surface of an article traveling along said path, and stop-arms mounted with an adjustable angle therebetween for closing one aperture as the next comes into view of the photoelectric tube for limiting light falling upon the tube to that corresponding to the full opening of a single aperture.

10. In a photoelectric sorter in which articles to be sorted travel along a path, a photoelectric tube, objective lens means for focusing an image of the article substantially in a focal plane, a stop at the objective lens for producing an image conforming substantially in shape to the sensitive area of the photoelectric tube, and a second lens means at said focal plane for focusing an image of the objective lens means on the photoelectric tube.

11. In a photoelectric sorter in which articles to be sorted travel along a path, a photoelectric tube, objective lens means for projecting light reflected from the article upon the photoelectric tube, and a stop at the objective lens which produces an image conforming substantially in shape to the sensitive area of the photoelectric tube.

DAVID C. COX.

No references cited.